United States Patent
Jiang et al.

(10) Patent No.: US 7,865,636 B2
(45) Date of Patent: Jan. 4, 2011

(54) BUFFER MANAGEMENT FOR WIRELESS USB ISOCHRONOUS IN ENDPOINTS

(75) Inventors: Sen Jiang, Beijing (CN); Zhenning Peng, Beijing (CN)

(73) Assignee: STMicroelectronics R&D Co. Ltd. (Beijing), Beijing (CN)

(*) Notice: Subject to any disclaimer, the term of this patent is extended or adjusted under 35 U.S.C. 154(b) by 304 days.

(21) Appl. No.: 12/021,187

(22) Filed: Jan. 28, 2008

(65) Prior Publication Data

US 2008/0183920 A1 Jul. 31, 2008

(30) Foreign Application Priority Data

Jan. 30, 2007 (CN) .................. 2007 1 0007913

(51) Int. Cl.
*G06F 7/02* (2006.01)
(52) U.S. Cl. .............. 710/53; 710/58; 710/29; 711/100; 340/825
(58) Field of Classification Search .......... 710/1, 710/798
See application file for complete search history.

(56) References Cited

U.S. PATENT DOCUMENTS

| | | | |
|---|---|---|---|
| 5,742,623 A * | 4/1998 | Nuber et al. ................. 714/798 |
| 5,978,858 A * | 11/1999 | Bonola et al. ................. 710/1 |
| 6,128,669 A * | 10/2000 | Moriarty et al. ................. 710/1 |
| 6,678,760 B2 | 1/2004 | Brief |
| 6,912,651 B1 | 6/2005 | Hamdi et al. |
| 7,263,573 B2 * | 8/2007 | Aull et al. ..................... 710/310 |
| 7,424,209 B2 * | 9/2008 | Mazur ......................... 386/125 |
| 7,668,243 B2 * | 2/2010 | Ho et al. ................. 375/240.28 |
| 7,689,753 B2 * | 3/2010 | Kwak et al. .................. 710/305 |
| 7,746,904 B2 * | 6/2010 | Miki et al. .................... 370/487 |
| 2005/0083792 A1 * | 4/2005 | Lee ........................... 369/30.01 |
| 2007/0097985 A1 * | 5/2007 | Lee ......................... 370/395.21 |
| 2007/0165526 A1 * | 7/2007 | Lee .............................. 370/230 |
| 2007/0294456 A1 * | 12/2007 | Chan et al. .................... 710/313 |
| 2008/0069026 A1 * | 3/2008 | Chan et al. .................... 370/315 |
| 2009/0285189 A1 * | 11/2009 | Kim et al. ..................... 370/338 |

OTHER PUBLICATIONS

Wireless Universal Serial Bus Specification, 2005, pp. 1-303.*
"Wireless Universal Serial Bus Specification", revision 1.0, Agere Systems, Inc., Hewlett-Packard Company, Intel Corporation, Microsoft Corporation, NEC Corporation, Koninklijke Philips Electronics N.V., Samsung Electronics Co., Ltd., May 12, 2005, pp. i-viii, 1-292.

* cited by examiner

*Primary Examiner*—Cheng-Yuan Tseng
(74) *Attorney, Agent, or Firm*—Lisa K. Jorgenson; William J. Kubida

(57) ABSTRACT

An apparatus such as a Device Wire Adapter (DWA) with improved buffer management and packaging of Wireless Universal Serial Bus (WUSB) isochronous packets for transmission to a host. The apparatus includes an isochronous IN endpoint that receives data segments from a device function. Memory is associated with the endpoint and includes an endpoint buffer configured in a loop and a plurality of registers. The apparatus includes an endpoint controller that stores the received data segments sequentially in the loop buffer, assigns a set of the registers to each of the stored data segments, and stores additional packet information in the registers for each of the data segments rather than in the endpoint buffer. The additional packet information includes presentation time for the stored data segment derived from a sample time of a last segment in the buffer and a time interval between two consecutive data segments in the buffer.

18 Claims, 10 Drawing Sheets

BUFFER MANAGEMENT FOR WIRELESS USB ISOCHRONOUS IN ENDPOINTS

RELATED APPLICATION

The present application claims priority of Chinese Application No. 200710007913.6 filed Jan. 30, 2007, which is incorporated herein in its entirety by this reference.

BACKGROUND OF THE INVENTION

1. Field of the Invention

The present invention relates, in general, to the Wireless Universal Serial Bus (WUSB) protocol and to devices that implement the WUSB protocol (i.e., WUSB devices), and, more particularly, to methods of managing buffers in WUSB devices with isochronous IN endpoints to limit the amount of memory required for endpoint buffers and to reduce the complexity of managing the endpoint buffers while complying with WUSB specifications for data packets.

2. Relevant Background

Universal Serial Bus (USB) communications have significantly improved communications between personal computers (PCs) or other host devices and external peripheral devices such as storage devices, scanners, personal digital assistants (PDAs), external hard drives, keyboards, mice, video cameras, printers, cell and other telephones, displays, voice recorders and microphones, and other devices that communicate digital information with applications and/or embedded systems on the PC or host device. In 2005, analysts estimated there were over 500 million USB products in use. USB provided an asynchronous serial interconnect between a host and one or many peripheral devices. Initially, USB was a protocol useful for wired connections, e.g., the peripheral needed to be plugged into a port on the host PC, but the Wireless Universal Serial Bus (WUSB) specification defines a protocol for a host to communicate at high bandwidths wirelessly with peripheral devices, such as via Ultra-WideBand (UWB) radio technology, without the need for cables or physical ports. The WUSB is a logical bus that supports data exchange between a host device and a wide range of simultaneously accessible peripherals or devices.

The WUSB Specification, Rev. 1.0, issued on May 12, 2005 is generally based upon and expands the USB protocol. In USB communications, each USB device or peripheral is connected to a hub or directly to a host (e.g., a PC with a USB host controller). Under WUSB, there are no hubs and the peripherals or WUSB devices communicate directly with the host and, in some cases, a device wire adapter (DWA) is connected or wired to one or more USB devices to allow the wired USB devices to communicate in a wireless fashion with the host (e.g., a DWA can be thought of as acting as a host for a wired USB system). In either case, the host controls all communications on a USB or WUSB bus and only one device communicates with the host at a time. When a device is first connected to a host, the host detects its presence and requests basic information from the device such as communication speeds supported by the device, the bandwidth the device requires, and what data transfer type the device utilizes. The initialization process is referred to as enumeration and includes the host assigning a unique address to the device. There are four data transfer types used to transmit USB and WUSB data: control, bulk, interrupt, and isochronous. Isochronous transfer allows devices to transfer large amounts of data in real time by guaranteeing a delivery time or bandwidth for the device data to be transmitted but without error correction. Devices that utilize isochronous transfer such as video or web cameras, music playing devices such as USB speakers, microphones, and the like, have to be tolerant of occasional corrupt data packets arriving at the destination.

Endpoints are provided within each device or peripheral in a USB or WUSB system. Endpoints are a uniquely addressable portion of a device that is considered the terminus of communication flow between a host and the device and are utilized for transmitting and receiving data over the bus. Typically, there are sixteen addressable endpoints available in each device and each contains an address number and a direction or endpoint number. The endpoint address references one of the 16 endpoint buffers or registers within the device and the endpoint number defines if the data is traveling to or from the host, with the reference being from the host's point of view. Hence, an "IN endpoint" is an endpoint that is transmitting data from the device to the host and an "OUT endpoint" describes data that is traveling from the host to the device. The communication exchange between a host and a device that is initialized or set up during enumeration is referred to as a "pipe" which is a virtual connection between a device's endpoints and the device's controlling software or drivers that are located in the host. The pipe is a pathway for all data exchanged between the host and the device. A significant, ongoing challenge for WUSB developers is to design isochronous endpoints or WUSB devices with isochronous endpoints to effectively manage communications on the pipes (or over the WUSB bus) and buffering of data at the endpoints. Preferably, such designs would be created to control the amount of memory required to support buffers or registers for each endpoint while supporting all requirements of the WUSB specification because a WUSB device must implement all of the required features of the WUSB protocol in order to communicate via a WUSB channel or pipe with a host.

Specifically, the issue of buffer management for wireless USB or WUSB isochronous IN endpoints is an issue that has to be addressed when designing or configuring a WUSB device or peripheral. During the data phase of a WUSB transaction, a series of data packets are transmitted and this data transfer is called "data bursting." FIG. 1 illustrates WUSB data bursting according to the WUSB protocol. In order to guarantee reliable data delivery, WUSB systems or clusters, such as a cluster 100 including a transmitter or device with an IN endpoint 110 and a receiver such as a host device 120, perform data bursting of packets 130 using a simple sliding window protocol to attach a sequence number with each packet 130. As shown, the transmitter 110 includes a data buffer 112 that stores data from an endpoint function prior to its being transferred by the data transmitter 114, and, similarly, the receiver or host device 120 includes a data receiver 126 that receives the packets 130 over the WUSB bus or a pipe in such a bus in a receiving window and passes the data to a data buffer 128 for later transfer to a host application, function, or embedded system for use. According to the WUSB Specification, buffer size selection for an isochronous IN endpoint is an application specific decision, and the only guidance is that the size should be selected by balancing several factors including desired short term error tolerance, cost, and acceptable stream delay and/or latency. In other words, buffer size and buffer management is left mainly to the WUSB developer and little guidance is provided in how best to achieve desired results such as reduced memory, lower cost, and/or limited delay and errors.

Besides providing a sequence number, each WUSB isochronous packet is required to have a special format with some of the specific requirements being listed in Table 1 below. WUSB isochronous IN endpoints must aggregate isochronous data into the largest packets that it can send over the air or WUSB bus without splitting a single data segment across multiple WUSB packets. In isochronous IN transfer, the wPresentationTime field is the sample time of the first segment in the packet. The interval between two consecutive data segments is assumed to be fixed in one packet and is used to determine the presentation time of the following segments in the packet. If one segment has no data, the endpoint should set its length as zero explicitly. In response to a request for data from the host or receiver 120, the isochronous IN endpoint in receiver 110 responds by transmitting the oldest data in its buffer 112 for each WUSB isochronous IN request. When the buffer 112 is full, the isochronous IN endpoint 110 discards the oldest data in the buffer 112. If the isochronous IN endpoint has already tried to transmit the discarded data, it attempts to transfer the oldest available non-discarded packets using the same burst sequence number(s) as the discarded packet(s). Additionally, it may be desirable for the WUSB isochronous IN endpoint in receiver 110 to support dynamic switching and/or to be continually scalable, which may allow the maximum packet size or interval to be changed without interrupting its transfer. These optional features make isochronous transfer smoother over the unstable wireless channel.

advances the window for new packets. As shown in FIG. 1, the receiver 120 sends the current receive window as burst acknowledgment information to the transmitter during the handshake phase of the transaction. When the transaction is an OUT transfer, the burst acknowledgement is in the data payload of a Handshake Packet. When transaction is an IN transaction, the burst acknowledgement is in a subsequent Micro-scheduled Management Command (DINAck in $W_{DT}CTA$ information block as specified by the WUSB Specification). The burst acknowledgement is a bit vector representation of the receive window. The '1' bits in the bit vector represent the receive window. The receiver 120 must use data received in strict ascending sequence number order (except in isochronous discard cases). In the WUSB specification, the following variables are defined to support data bursting: Maximum Packet Size (MPS), which is the nominal data unit size for all data packets; Maximum Burst Size (MBS), which is the largest number of packets an endpoint can accommodate in a single data phase and the MBS in FIG. 1 is 3; and Maximum Sequence (MaxSeq), which is the range of sequence numbers that must be used when transferring data to this endpoint and the actual range of sequence numbers for the endpoint is zero to (MaxSeq-1).

TABLE 1

WUSB isochronous packet format

| Offset | Field | Size | Value | Description |
|---|---|---|---|---|
| 0 | bmAttributes | 1 | Bitmap | Endpoint number, IDATA, Direction |
| 1 | bmStatus | 1 | Bitmap | Bit 4:0 is Sequence Number |
| 2 | bNumIsoSegments | 1 | Number | This field indicates the number of data segments that are contained in the data payload of the packet. There must be at least one data segment in an isochronous data packet. |
| 3 | wPresentationTime | 2 | Number | The presentation time on the Wireless USB channel associated with Data1. wPresentationTime has a 125 microsecond granularity. |
| 5 | wLength1 | 2 | Number | The length of the data in data segment 1 (Data1) in bytes. |
| 7 | Data1 | Var | RawData | The data for data segment one. |
| ... | | | | |
| Var | wLengthN | 2 | Number | The length of the data in data segment N (DataN) in bytes. |
| Var + 2 | DataN | Var | RawData | The data for data segment one. |

The WUSB Specification, Rev. 1, released by the USB Industry Forum provides the general data bursting model as illustrated in FIG. 1. This does not provide a complete solution as to buffer management for WUSB isochronous IN endpoints, which are responsible for buffering data from an application on a WUSB device or peripheral and packaging the data in WUSB isochronous packets. In the general data bursting model of cluster 100, the transmitter 110 has a data stream that is logically segmented into maximum packet sized portions. It also maintains a sliding transmit window in its data transmitter 114 that controls how sequence numbers are associated with each data packet 130 for the next transaction data phase. The transmitter 110 must associate sequence numbers with data buffer segments in strict, ascending sequence number order. The receiver 120 maintains a receive window in its data receiver 126 that identifies which data sequence numbers (and by association which data packets) it will retain for use from the coming transaction. When the transaction is done, the receiver 120 wipes the sequence numbers of the retained packets from the receive window and The WUSB Specification also provides a simple example of an isochronous IN endpoint that may be used to buffer and package data from an application in a device wire adapter (DWA), but this example also fails to satisfactorily address memory or buffer management issues associated with WUSB data transfers. FIG. 2 shows a data burst process example for a DWA with an isochronous IN endpoint provided in the WUSB specification. In the example process 200, in response to the first poll attempt by the host which occurs before frame 642, the DWA begins transactions to the downstream USB 2.0 function endpoint (i.e., to one of the downstream wired USB devices or peripherals plugged into the DWA) in the next frame (i.e. 643). In each frame after 642, the DWA conducts isochronous IN transactions to the USB 2.0 function endpoint. The DWA continually stores all of the data received during a service interval into the buffer and records the frame time of the first data received from the USB 2.0 device during the interval. In the next interval (N+1), the host polls the DWA's isochronous function endpoint, and the DWA returns the data it has ready to transmit. At the time the $W_{DT}CTA$ during interval N+1 is transmitted by the host, the DWA has not completely received any data from the USB 2.0 function endpoint during the interval, and so the DWA only transmits the complete data it does have. The format of the resultant data packet is illustrated in FIG. 2. Since two packets were received from the USB 2.0 function endpoint in interval N, in response to the second $W_{DT}CTA$ poll, the DWA transmits a packet that includes the two samples received and the presentation time of when data was first received. In the next interval (N+2), the host polls the DWA's isochronous function endpoint and receives the next set of isochronous segments ready (i.e., Data 3, 4 and 5), with the frame number where the first packet (i.e. Data 3 at 645) was received from the USB 2.0 function endpoint.

Neither the general data burst model shown in FIG. 1 nor the DWA isochronous IN endpoint example shown in FIG. 2 are completely successful in meeting the demands for effective buffer management and control of WUSB device memory requirements. The general data burst model is not particularly well suited to isochronous transfer because of the required special format for the isochronous data packet. Specifically, besides raw data, each isochronous data packet includes some variable fields including presentation time and the number of segments. The general data burst model cannot provide or pre-define these fields for each packet. Further issues include the fact that the WUSB protocol does not require individual isochronous data packets to be maximum packet size but yet a single data segment cannot be split into multiple packets. The DWA IN endpoint example involves data segments being stored in an IN endpoint buffer in WUSB isochronous packet format. The presentation time, the number of segments, and the length variables for each WUSB packet are stored along with the raw data in the IN endpoint buffer. This exemplary method of controlling endpoint communications allocates a significant amount of memory in the WUSB device containing the endpoint to store the additional information (i.e., the data required of WUSB packets beyond the raw data). Further, if the maximum packet size or MPS is changed, the endpoint needs to repackage all data segments in the buffer and rearrange their position in the buffer. This makes buffer management very complex, and as a result, it is difficult to use this model to support dynamic switching and to configure DWAs and other WUSB devices with IN endpoints that are continuously scalable. In addition, the DWA IN endpoint example shown in FIG. 2 does not provide methods to associate the packets with the sequence numbers, to discard data, or to reuse the sequence number when the buffer overflows.

Hence, there remains a need for improved methods, and devices that implement such methods, for managing buffers of isochronous IN endpoints in WUSB devices. Preferably such buffer management methods would provide solutions that use less memory than the simple examples provided in the WUSB Specification, Rev. 1.0 while still fully complying with requirements placed on IN endpoints and isochronous data packets transmitted to hosts in WUSB clusters or systems by WUSB protocols.

SUMMARY OF THE INVENTION

To address the above and other problems, a buffer management method is provided for use in WUSB devices and, particularly, in WUSB devices with isochronous IN endpoints for limiting the amount of memory required and the complexity while still being able to package isochronous data packets for transmission to a WUSB host. In the example of buffering provided in the WUSB Specification, Rev. 1.0 for a Device Wire Adapter (DWA) with an isochronous IN endpoint, the endpoint packages data segments into the WUSB isochronous packet format as soon as data is written into the buffer. As a result, the endpoint buffer has to store the presentation time and other additional information with the raw data for each segment. In contrast, buffer management according to embodiments of the invention involves the endpoint or its controller and a buffer management or control module acting to package data segments only after they are requested by a host in a transmit window. The endpoint (or the WUSB device with such an endpoint) derives the presentation time rather than storing it in the endpoint buffer and obtains or determines additional packet information for each segment in the transmit window. The derived presentation time and other additional packet information are stored in a register set or registers associated with each of the data segments. The register sets are linked by an index to the corresponding data segments that have been stored in a loop buffer (e.g., the raw data and a length field for the raw data is stored in the endpoint buffer and not all data and information necessary to package a WUSB packet). The method involves the detailed operations to associate additional packet information with the stored data segment in the buffer to compose WUSB isochronous packets. Additionally, the buffer management method presents detailed operations and rules to associate the packets with the sequence numbers, to discard data at the endpoint and reuse sequence numbers when the loop buffer is in an overflow state. Briefly, the inventive buffer management method includes storing packets' additional information required for WUSB isochronous packets in register sets and deriving presentation times from the real sample time of the last segment in the buffer. The buffer management includes methods to associate sequence numbers with data segments and supports dynamic change of maximum packet size (MPS) as well as the interval.

More particularly, an apparatus such as a WUSB device or a DWA is provided with improved buffer management and packaging of WUSB isochronous packets for transmission to a host. The apparatus includes an IN endpoint that receives data segments from a device function such as a function within the apparatus or from a device function or application in a USB device connected to a port of the apparatus (e.g., when the apparatus is a DWA). Memory is associated with the endpoint and includes an endpoint buffer configured in a loop and a plurality of registers. The apparatus includes an endpoint controller that stores the received data segments sequentially in the loop buffer, assigns a set of the registers to each WUSB isochronous packet requested in the transmit window, and derives additional packet information in the registers for each WUSB isochronous packet requested in the transmit window. The additional packet information may include a presentation time, an index into the loop buffer for the associated data segments, the total length and the number of segments in the associated data segments. The presentation time is derived by the endpoint controller from a sample time of a last segment in the buffer and a time interval between two consecutive data segments in the buffer.

The additional packet information is used by the endpoint controller in packaging the consecutive data segments into WUSB isochronous packets for transmittal over a WUSB channel to a host. To match the transmit window requested from the host, the information typically also includes a sequence number for each WUSB isochronous packet. During operation, the endpoint receives host instructions to transmit a set of data packets and in response, the endpoint controller determines a transmit window including a set of sequence numbers and then packages some consecutive data segments in the loop buffer having sequence numbers in their registers that match the transmit window sequence numbers. Generally, the registers are arranged into a number of sets in the memory corresponding with the maximum burst size (MBS) defined for the endpoint and these register sets are arranged in a transmit order that matches the sequence numbers of the transmit window. The endpoint may also receive a request to change an interval between consecutive ones of the data segments to a new interval value and to change a maximum packet size (MPS) for use in packaging of the stored data segments into WUSB isochronous packets. The endpoint controller responds by modifying or deriving the packet information in the register sets with new interval or MPS assisted by 6, for example, auxiliary variables to support these new values.

DETAILED DESCRIPTION OF THE PREFERRED EMBODIMENTS

Figure 1:
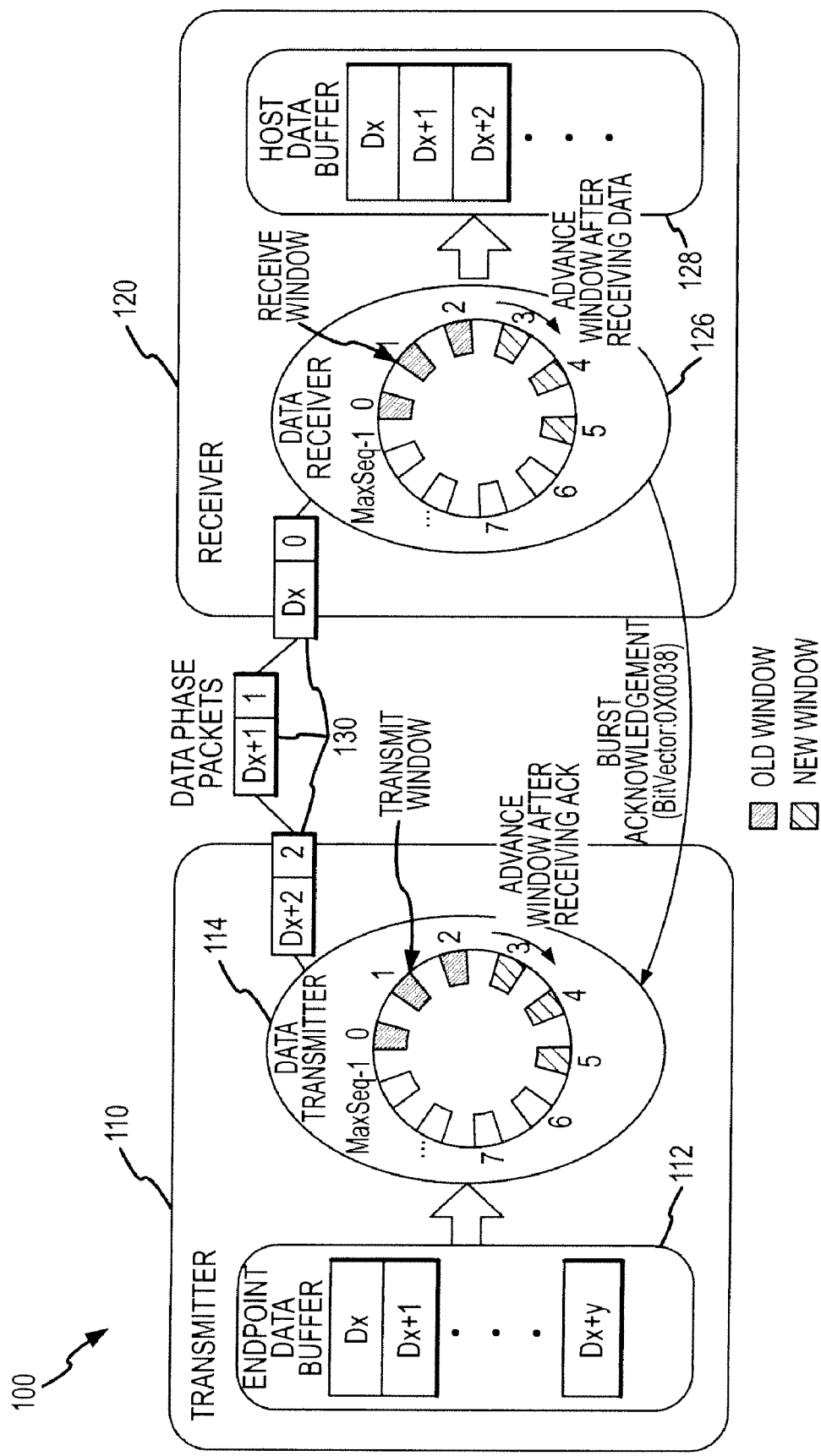
FIG. 1 illustrates a portion of a WUSB cluster performing data bursting according to general data burst rules provided in the WUSB protocol.
Figure 2:
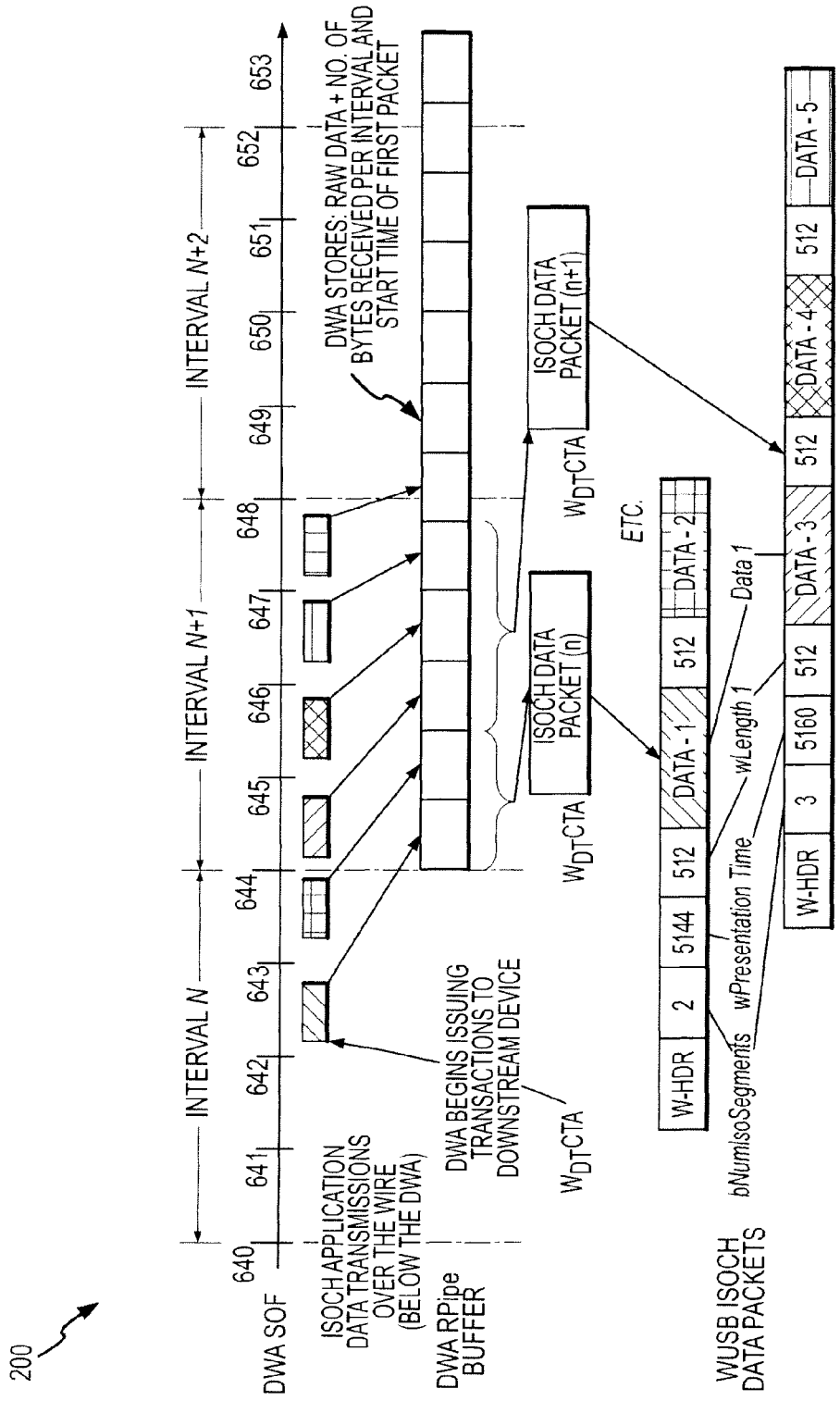
FIG. 2 illustrates a full-speed isochronous IN data stream through a DWA as described by the WUSB Specification, Rev. 1.0.

The present invention is directed to methods and systems for managing communications from Wireless Universal Serial Bus (WUSB) devices to a WUSB host according to the Wireless USB specification or protocol. These WUSB devices may include, for example, a Device Wire Adapter (DWA) or native WUSB devices. The method of the invention is generally directed to providing improved buffer management in devices with isochronous IN endpoints that are communicating over a channel or pipe with a host. More particularly, the method enables WUSB isochronous IN endpoints or devices with such endpoints to buffer data with less memory as compared with other buffering techniques (e.g., the buffering methods shown in FIGS. 1 and 2). The buffer management methods of the invention also allow the endpoints to package WUSB isochronous packets with more flexibility and to support other desirable features such as dynamic switching and being continuously scalable with less complexity.

The buffer management method may be used in many devices configured to buffer data and to later present data packets that present raw data in a sequential manner along with additional data (such as presentation time) that requires memory in the device. The following description begins with a discussion of two exemplary WUSB systems or clusters that may include devices adapted to perform the buffer management techniques of the present invention with reference to FIGS. 3 and 4. The description then proceeds with specific implementations or processes performed by isochronous IN endpoints or their controllers to buffer data in the WUSB devices with less memory requirements and reduced or limited complexity with reference to FIGS. 5-11.

Figure 3:
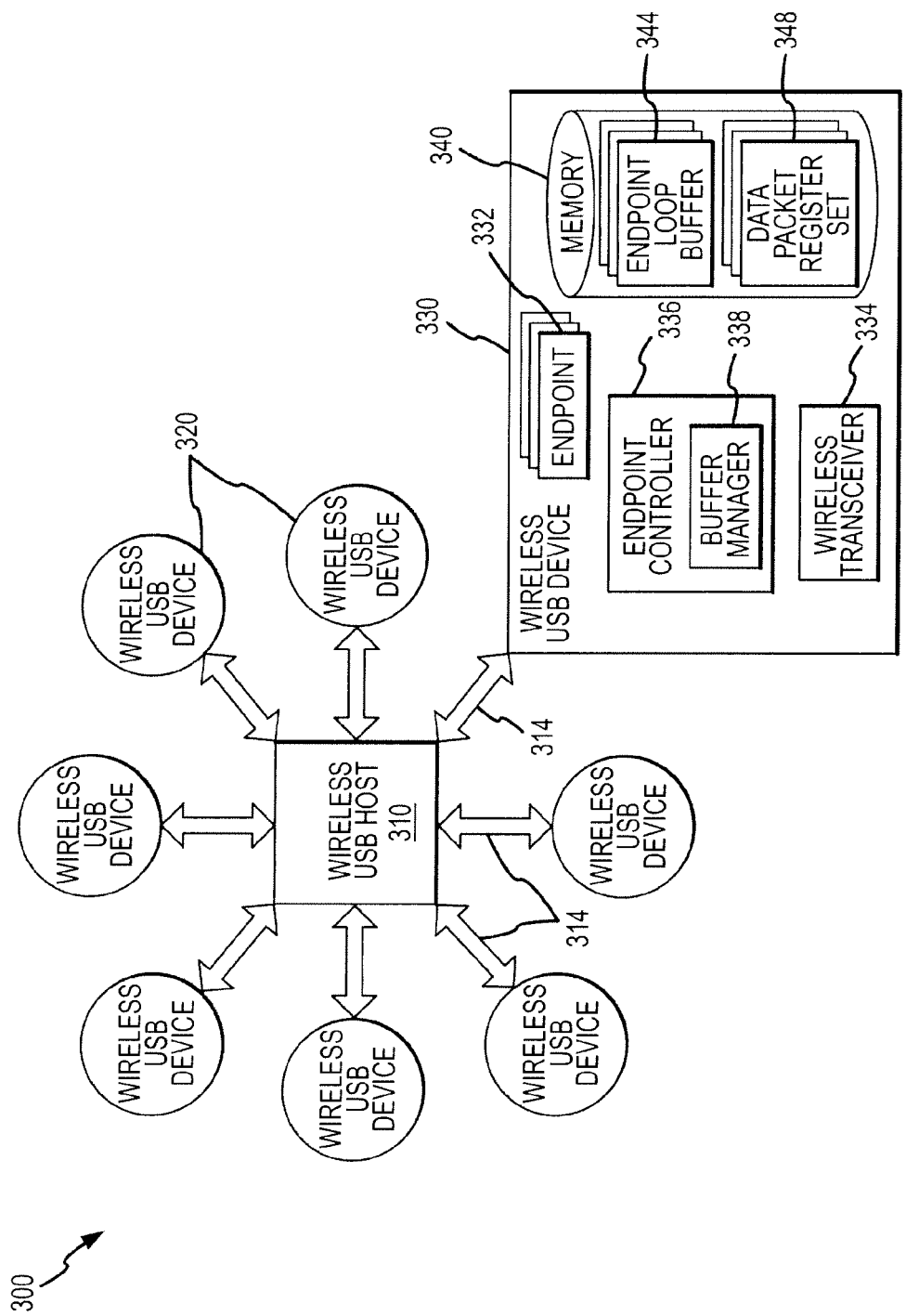
FIG. 3 illustrates in block form a WUSB cluster or system according to one embodiment of the invention with an exemplary wireless USB device for providing buffer management of endpoints, e.g., isochronous IN endpoints.

As discussed, the buffer management method of the invention is well suited for use in WUSB devices that are communicating with a WUSB host. In this regard, FIG. 3 illustrates an exemplary WUSB cluster or system 300 in which the buffer management methods of the present invention may be incorporated. As shown, the cluster 300 includes a wireless USB host 310 that may comprise a PC or other computing or electronic device that includes a host controller (e.g., a WUSB interface to an internal bus such as the PCI bus), which may be implemented in a combination of hardware, firmware, and/or software to comply with USB or WUSB protocols for a host. Typically, the host 310 also includes mechanism for transmitting and receiving data wirelessly such as a wireless transceiver or the like (or this may be achieved via a Host Wire Adapter that allows USB host functionality to be connected to a PC or similar device through a USB connection as shown in FIG. 4).

The host 310 communicates per the WUSB protocol over a wireless bus shown at 314 with a number of wireless USB devices 320. Typically, the wireless USB devices 320 may be functions or functional devices that provide capabilities to the cluster or system 300, such as printers, digital cameras, speakers, mice, joysticks, phones, PDAs, microphones, external hard drives, data storage, or the like, or be a device that provides a connection point for wired USB devices such as a Device Wire Adapter (DWA) as shown in FIG. 4. The devices 320 and 330 present a standard USB interface that comprehends the WUSB protocol, responds to standard WUSB operations such as configuration and reset, provides standard information expected by the host such as capability descriptive information, and otherwise complying with the WUSB protocol. The devices 320, 330 also are accessible by a WUSB address that is assigned when the device is attached and enumerated by the host 310. Each device 320, 330 supports one or more pipes 314 through which the host 310 may communicate with the device 320, 330 over a WUSB channel. The WUSB devices 320, 330 generally support a designated pipe at an endpoint zero to which the device's USB control pipe is attached. The devices 320, 330, as with other WUSB devices, support a common access mechanism for accessing information through this control pipe, and associated with the control pipe at endpoint zero is the information required to describe the device 320, 330 (e.g., standard descriptors defined in the WUSB Specification or the like).

Device 330 is illustrated in more detail to include components useful for carrying out the buffer management of the present invention, and similar components may be provided in one or more of the devices 320. As shown, the WUSB device 330 includes a wireless transceiver or other wireless transmitter/receiver 334 for communicating via bus or pipes 314 with host 310. The device includes endpoints 332, which generally include at least one isochronous IN endpoint that buffers data prior to preparing WUSB isochronous packets for transmittal to host 310. As with USB 2.0 devices, WUSB devices generally include endpoints that are the terminus of a communication flow between a host and a device. An endpoint controller 336 is provided for controlling the endpoints 332 and uses a buffer manager module 338, which may be implemented in hardware, firmware, and/or software, to perform buffer management methods of the present invention as described with reference to FIGS. 5-11. Further, the device 330 includes memory 340 including endpoint loop buffers 344 for use with the IN endpoints 332 and also data packet register sets 348 for storing information required for isochronous packets in addition to raw data (which may be stored in the loop buffers 344). Again, the buffer manager 338 and memory 340 configured as shown in device 330 may be provided in other ones of the devices 320, and the operation of these components is explained in more detail below with reference to FIGS. 5-11. Also, clusters 300 of the present invention generally include a host 310 and at least one device 330 but the number and type of WUSB device used to implement a cluster 300 is not limiting to the invention. As will be appreciated, the buffer management techniques described herein are applicable to nearly any device that includes isochronous IN endpoints that communicate with a Wireless USB host such as host 310.

Figure 4:
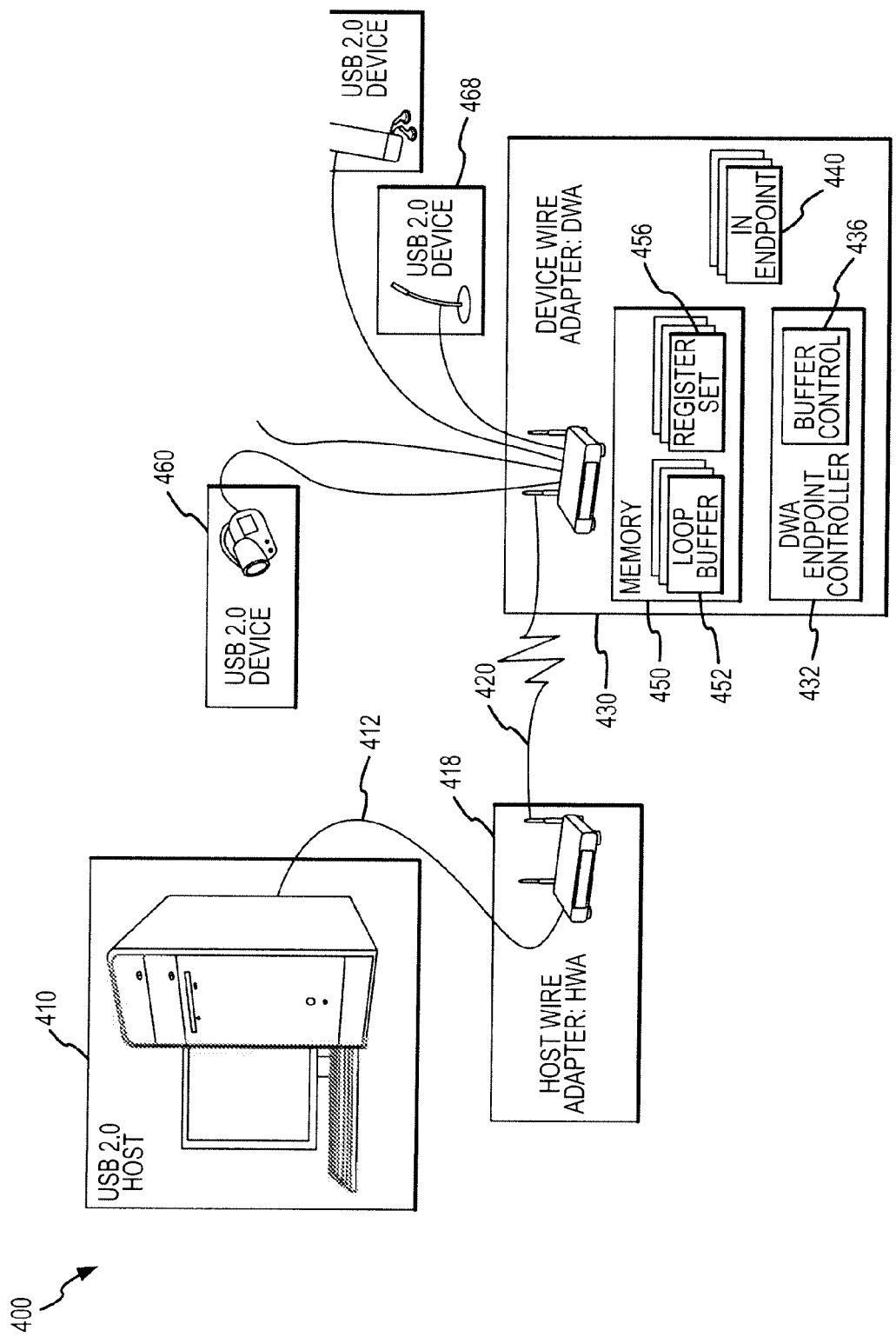
FIG. 4 illustrates another WUSB-based system configured to utilize device wire adapters (DWAs) as a host wire adapter and as a host to a number of USB devices or peripherals, with the host for the USB devices performing buffer management according to embodiments of the present invention.

FIG. 4 illustrates another cluster or system 400 according to the present invention. In contrast to the cluster 300, the cluster 400 uses a host wire adapter 418 (e.g., a HWA) in combination with a USB host 410 (such as a PC, a computer, or other computer or electronic device) to provide the host functionality for the cluster 400. The wire adapter 418 is shown to be wired to the USB host 410 and is configured to provide Wireless USB capability to the device 410. The cluster 400 further communicates over WUSB bus or channel 420 with a DWA 430, which is generally a wireless adapter that is configured for wireless connection to the host wire adapter 418 (or in other embodiments not shown directly to the host device 410). The DWA 430 is connected by cable or wire with a number of USB devices 460, 462, 464, 468 that are shown to be a keyboard, a printer, a music player, and a joystick but could be any USB-capable device. However, only USB-capable devices with isochronous IN endpoints such as digital video cameras, microphones, and the like use the invention provided via DWA 430 to communicate with a host 410 or host wire adapter 418. The DWA 430 generally will include USB connectors (such as USB 'A' connectors) that allow the wired USB devices 460-468 to be connected to the DWA 430. The DWA 430 allows the devices 460-468 to connect wirelessly with the host 410 via DWA 430 and host wire adapter 418.

The DWA 430 is generally configured as a conventional DWA that complies with WUSB protocol requirements for wireless communication with a host or a host wire adapter. Further, the DWA 430 is configured to support the buffer management techniques of the present invention. To this end, the DWA 430 includes a DWA endpoint controller 432 with a buffer control 436 (e.g., a software, hardware, and/or firmware mechanism or module that provides the functionality described with reference to FIGS. 5-11). The DWA 430 includes one or more isochronous IN endpoints 440. To support data transfer from the isochronous IN endpoints 440, which are supplied raw data from the devices 460 and 468, the DWA 430 includes memory 450 adapted with loop buffers 452 for each endpoint 440 and a set of register sets 456, which are provided for each packet in the transmit window as is explained in detail below. As will be appreciated by those skilled in the related art, the cluster 400 may be modified to include a plurality of WUSB devices that communicate with the host wire adapter 418 (such as the hub and spoke configuration shown in FIG. 3) or additional DWAs like DWA 430 linked to wired USB devices may be provided. The clusters 300 and 400 are shown as relatively simple examples of clusters and devices that may implement buffer management according to the present invention and are not intended to be limiting.

With reference to FIGS. 5-11, the operation of devices with WUSB isochronous IN endpoints is described to explain the solution to buffer management of isochronous IN endpoints provided by the present invention. The following description describes a buffer structure for use in buffering at such endpoints. As would be performed in the devices 320, 330 and 430 of FIGS. 3 and 4 (e.g., by the endpoints and/or their controllers with buffer managers/control modules), operations are described for buffering inputted data and associating data segments with additional information required by the WUSB protocol (such as sequence numbers, presentation times, the number of segments, and other information) to package WUSB isochronous packets in compliance with the WUSB protocol.

Figure 5:
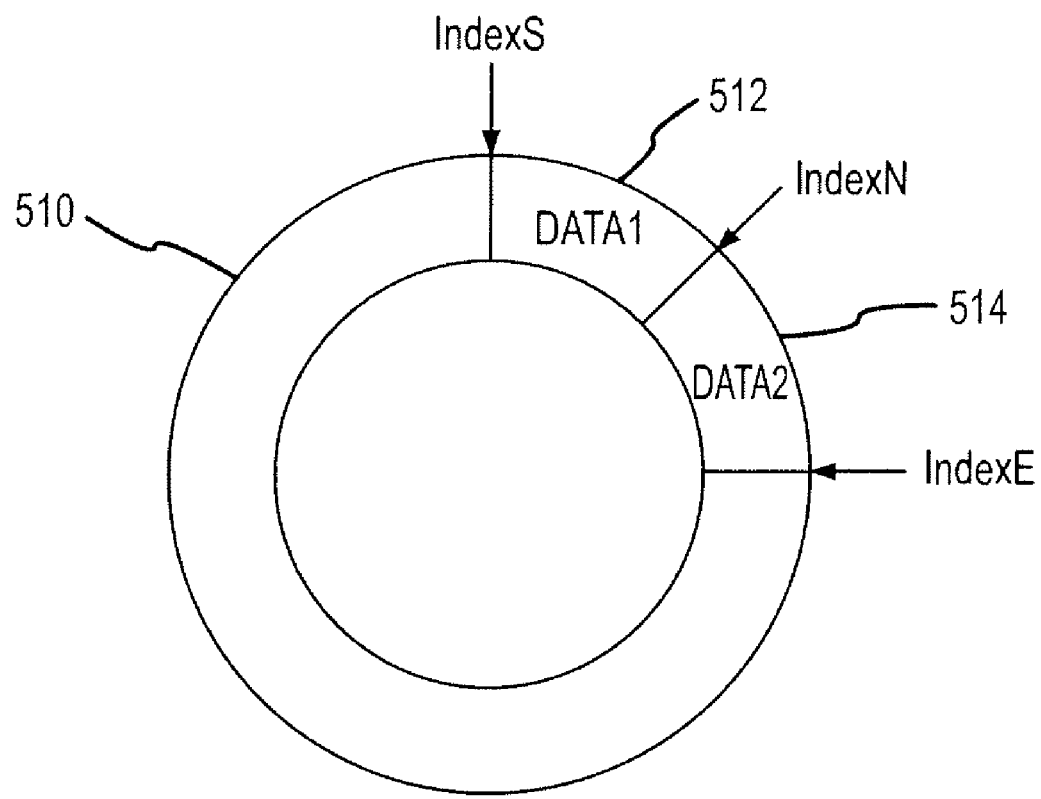
FIG. 5 shows a simple loop buffer with indices for use with IN endpoints according to the present invention such as with the WUSB devices of FIGS. 3 and 4.
Figure 6:
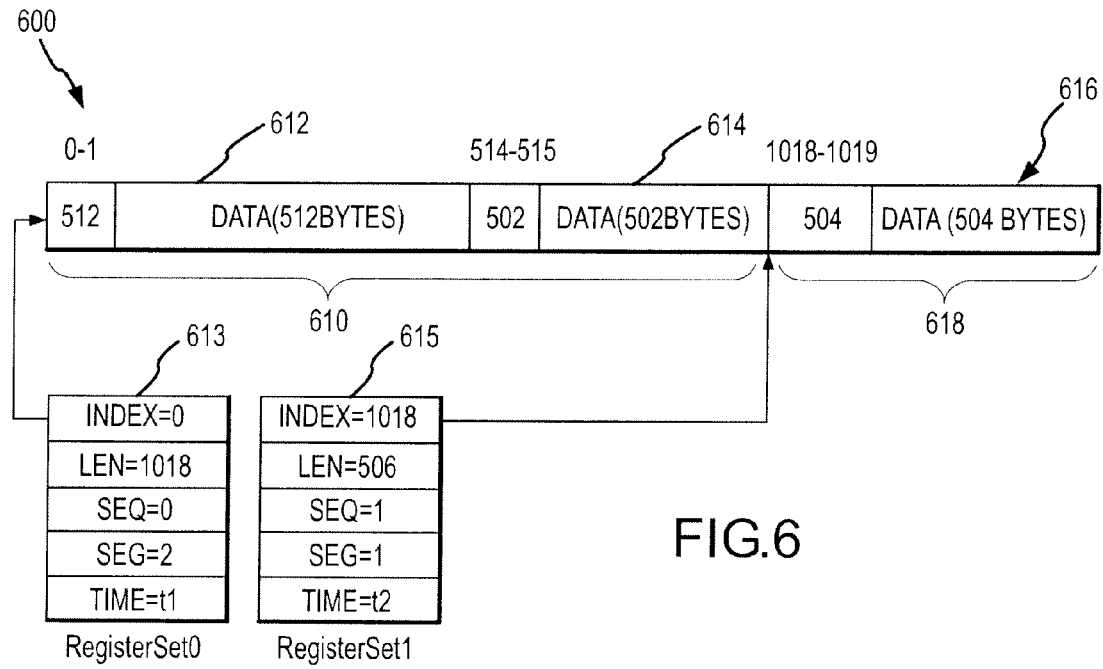
FIG. 6 illustrates register sets for use with WUSB packets in embodiments of the invention.

Briefly, as shown in FIG. 5, buffer management according to some embodiments of the invention uses a loop buffer 510 with indices (e.g., IndexS, IndexN, and IndexE) to store input data segments 512, 514 with their length in time order. To package several consecutive data segments into a WUSB isochronous packet easily and flexibly, the buffer management method associates a register set as shown in FIGS. 3, 4, and 6 with each packet in the transmit window. Input and output management are provided by the endpoint controllers to provide detailed operations and rules to store data from an application continually and to link several consecutive segments with the additional information kept in the register sets to compose WUSB packets (e.g., link segments with additional WUSB packet information or packet packaging information stored in the registers). In some embodiments, presentation time is a component of the additional WUSB packet information and the buffer management method includes deriving the presentation time for each packet from the sample time of the last segment in the loop buffer 510, which achieves an acceptable trade off between accuracy and complexity and also supports dynamic switching and continuous scalability.

More particularly, in some preferred embodiments as shown in FIG. 5, a buffer 510 is provided for each isochronous IN endpoint of a device in the device's memory. The buffer 510 for the isochronous IN function endpoint is a contiguous memory, and it occupies S bytes and operates in a loop manner as shown in FIG. 5. Several indices are used with the loop buffer 510 including: IndexS that is the index for the start of the data stored in the buffer 510; IndexE that is the index for the end of the buffer data; and IndexN that is the index for the end of the current transmit window for the endpoint. Assuming data is written into the buffer 510 in one or more segments 512, 514, the length of the segment is attached at the beginning of each segment 512, 514, e.g., in the first 2 bytes of the segments 512, 514. Then, these segments 512, 514 with the length field (not shown) are stored consecutively in the loop buffer 510 as shown in FIG. 5.

To assemble data segments such as segments 512, 514 from the buffer 510 into WUSB isochronous packets, the endpoint (or its controller) associates a set of registers with each packet in the current burst or transmit window to record several variables or packet packaging information, e.g., variables required beyond length and raw data to properly format a WUSB isochronous packet for transmittal to a host from the IN endpoint (or WUSB device with such an endpoint). FIG. 6 illustrates the formatting 600 of two exemplary WUSB isochronous packets 610 and 618 according to the invention. As shown, the packet 610 includes two segments 612, 614 and the packet 618 includes one segment 616 stored in a loop buffer associated with an endpoint and the data may be from applications associated with the endpoints, from wired USB devices when the device with the endpoint is a DWA, or other function data provided to the IN endpoint for transmittal to a host. To assemble data segments like segment 612, 614, 616 into WUSB isochronous packets, the endpoint or its controller associates a set of registers 613, 615 with each packet 610, 618 in the current burst window.

The registers 613, 615 are used to record several variables required to format a WUSB isochronous packet and to provide an index or link to the packet in the buffer. The data segments 612, 614, and 616 are shown to include a raw data field as well as a length field indicating the length of the data field. The registers 613, 615 record an index to 612 and 616 respectively, because 612 and 616 are the first segments of the two packets. The number of register sets 613, 615 is equal to the maximum burst size (or MBS) of the endpoint. These register sets are arrayed in the transmission order of the associated packets in one embodiment of the invention. In the embodiment of FIG. 6, the register sets 613, 615 numbered from 0 are used to store additional WUSB isochronous packet information that includes: the total length of the associated or linked consecutive data segments, the number of segments in the packet, the sequence number associated with the packet, and a presentation time that is the sample time of the first segment of the associated or linked consecutive data segments as well as the beginning index of the associated or linked consecutive data segments.

Figure 7:
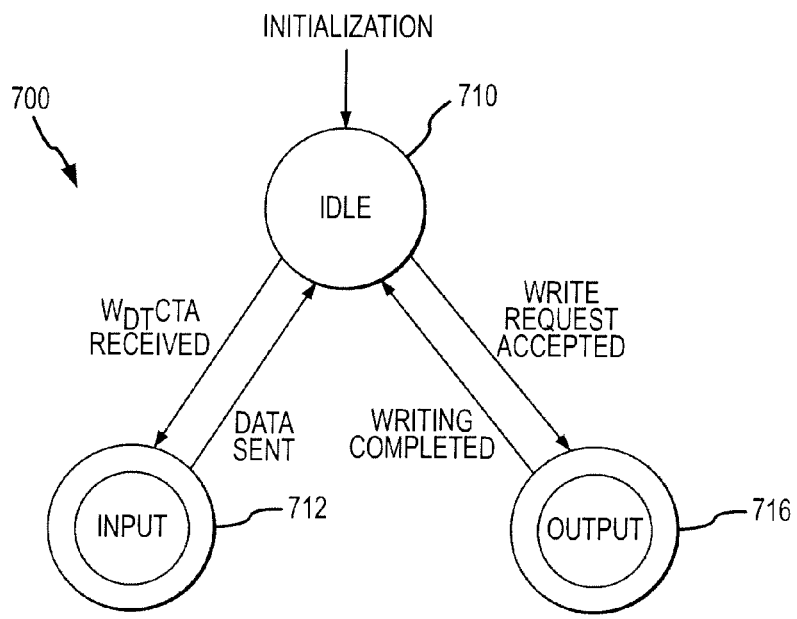
FIG. 7 is a state machine for buffer management implemented by endpoint controllers of the present invention.

The state machine 700 for buffer management according to an embodiment of the invention is provided in FIG. 7. The state machine 700 is shown to have three states: idle 710, input 712, and output 716. The functions of buffer management of input management and output management are implemented in the input and output states 712, 716, respectively. Additionally, to assist buffer management, some parameters are typically maintained and stored in memory associated with the IN endpoint. These parameters include: N which is the number of data segments from IndexN to IndexE (shown in FIG. 5); T which is the presentation time of the last data segment in the loop buffer; and P is the time interval between two consecutive segments. When the endpoint is setup or reset, its buffer management enters idle state after these parameters and the register sets are initialized. The main function of these additional parameters is to allow the endpoint or its controller to derive the presentation time for each packet. To support dynamic changing of the maximum packet size (or MPS) and interval, another set of these parameters are defined, e.g., NextN, NextT, and NextP as discussed below, which allows the data segments stored in loop buffer have two kinds of intervals. Host responds for controlling the device function associated with the endpoint so as to not change the interval too frequently.

Figure 8:
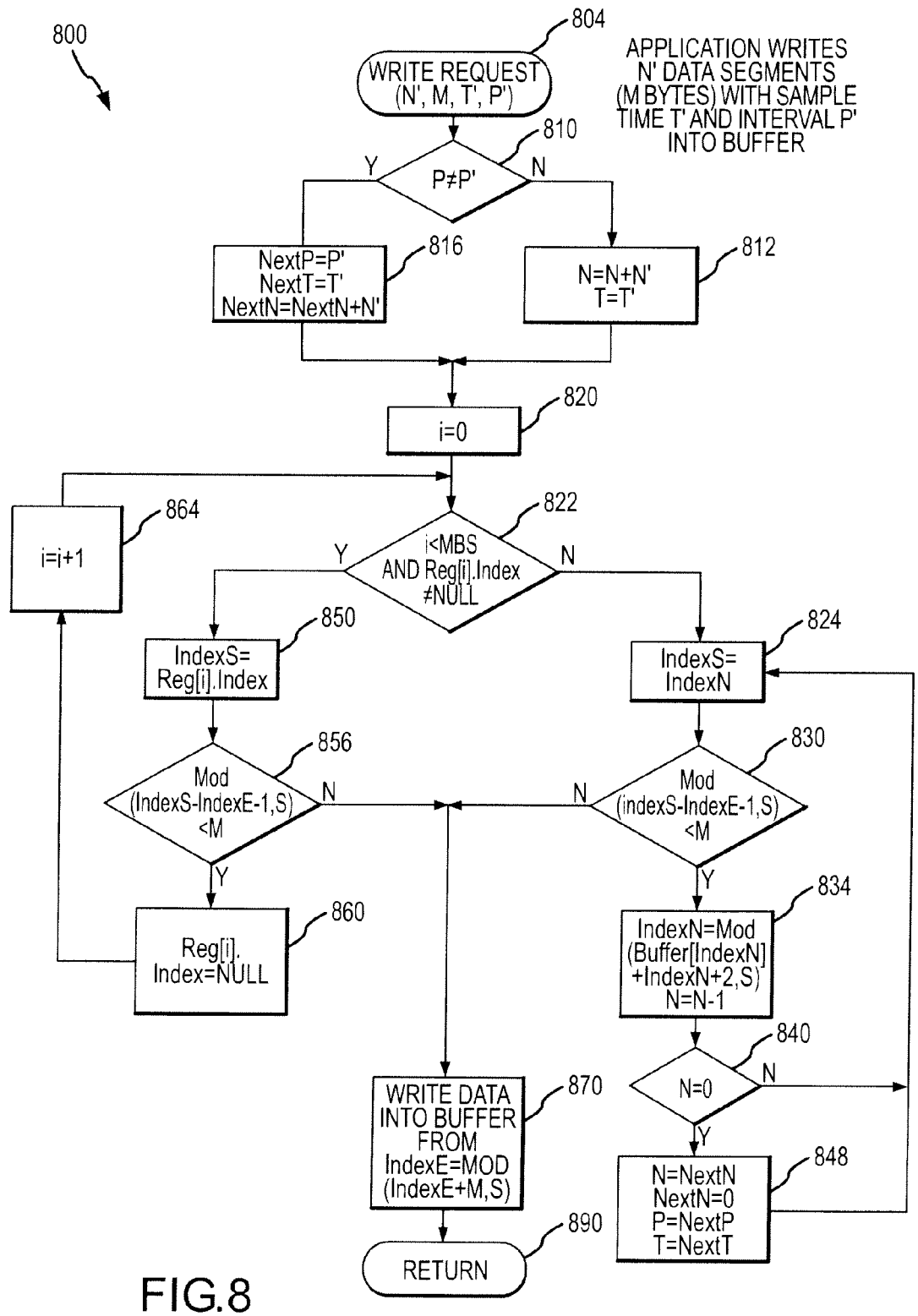
FIG. 8 is a flow diagram showing input management performed by IN endpoints in embodiments of the present invention.
Figure 9:
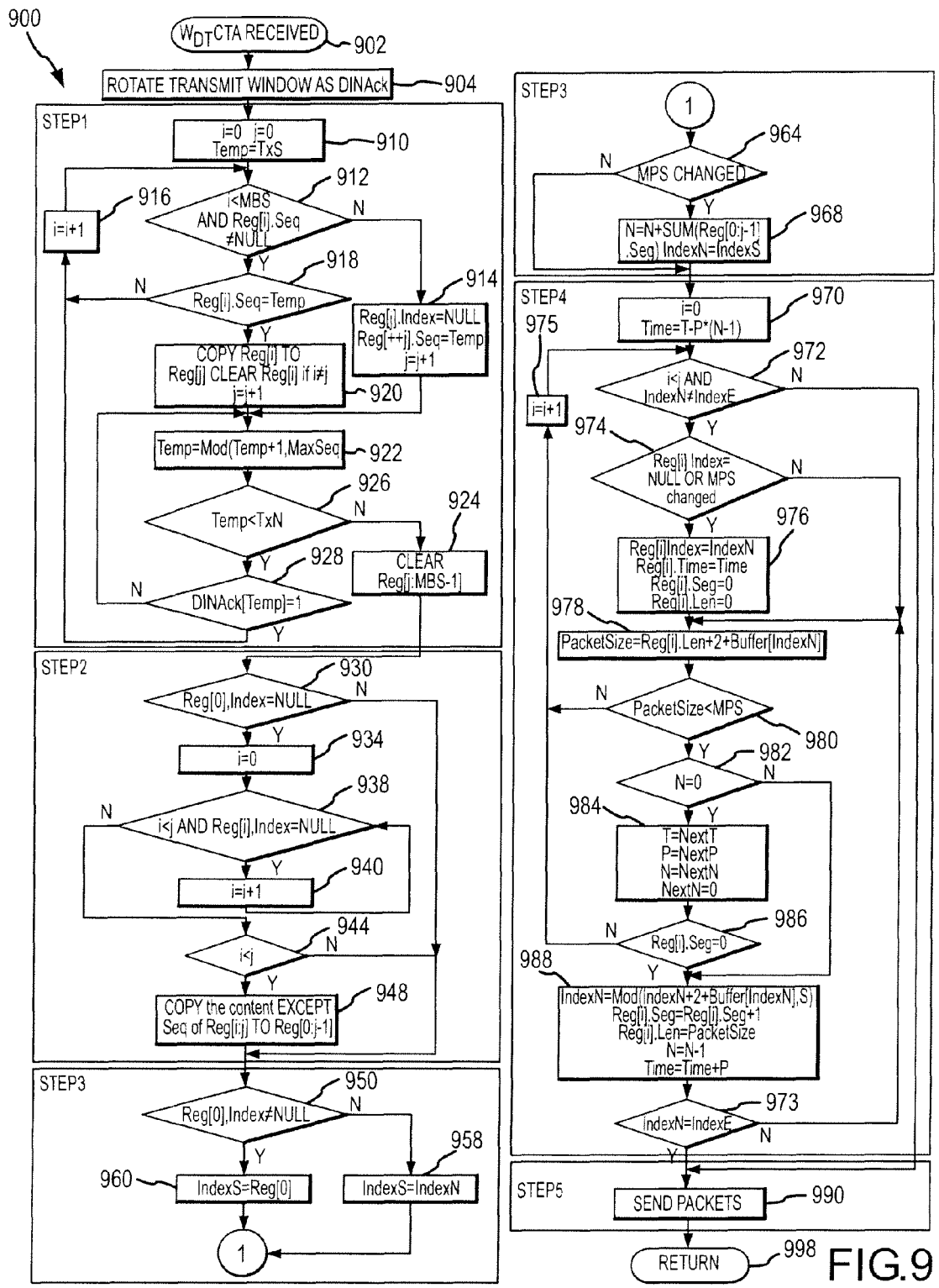
FIG. 9 is a flow diagram showing output management performed by IN endpoints to manage buffers and the data phase of a WUSB transaction.

Buffer management performed at an IN endpoint may be thought of as involving input management and output management. FIG. 8 illustrates exemplary steps of input management 800 while FIG. 9 illustrates exemplary steps involved in output management 900. Input management 800 arranges an application's data from a function on the device or as received from a wired USB device into a loop endpoint buffer when a write request from the application is accepted at 804. This may be thought of as being performed in two general steps including updating the associated indices and parameters to allocate space for the new data (as shown by substeps 810 to 848) and writing data segments into the endpoint loop buffer (as shown at substep 870), which is followed by return 890.

With reference to the first broader step, the embodiment of method 800 assumes that the write request received or accepted at 804 contains four parameters (i.e., the number of segments to be input, the interval between two segments, the sample time of the last segment, and the total length of the segments to be input as denoted in FIG. 8 by N', P', T', and M, respectively). At 810, the method 800 determines whether the interval P' differs from the original interval P in the buffer, and when the two intervals are the same, the endpoint at 812 adds N' into N and updates T to T'. If the intervals differ, the endpoint updates NextP, NextN, and NextT at 816. Before writing data segments into the loop buffer from IndexE at 870, the endpoint checks the empty memory, discards the oldest data segments and releases enough memory to accommodate it as shown at steps 820 to 864. In this process, at first the endpoint attempts to discard the packets pointed to by the register set one by one until the empty memory is enough as shown at 820, 822, 850, 856, 860, and 864. The attempt begins from the first register set; so, at substep 820, the index of register set i is initialized to zero. If the current register set is determined at 822 to point to a packet, IndexS is moved to the head of this packet to release the memory before this packet at 850.

At 856, the empty memory is checked to determine whether it is larger than the size of the data segments to be written in. If the empty memory is not enough, the packet pointed to by the current register set is discarded at 860 and the process goes to the next register set at 864. When the current register set does not point to a packet, all packets associated with the register sets are discarded and the endpoint attempts to discard the rest of the data segments one by one until the empty memory is enough as shown at 824 to 848. At 824, IndexS is moved to IndexN to release the memory before IndexN. Then, the size of the empty memory is checked at 830. If it is smaller than the size of data to be written in, IndexN is moved to the next data segments (as discussed with reference to FIGS. 5 and 6, the length of the segment is attached to each segment when it is stored in the loop buffer) to discard the current data segment and the left data segments N is decreased by one at 834. If N is not equal to 0, steps 824 to 840 are repeated to discard the next data segment. When N arrives at 0, the data segments with original interval have been completely discarded. In order to discard the data segment with a new interval, NextN, NextP, and NextT are loaded into N, P, and T at 848. When the empty memory is adequate or enough, the inputted data is written into the loop buffer from IndexE and then the endpoint adds M to IndexE with modular S to position the current end of the data segments in the loop buffer as shown at 870.

In FIG. 8, "Reg[i]" is the i+1-th register set associated with the i+1-th packet in the current transmit window for the IN endpoint. Reg[i] contains Index, Len, Seq, Seg, and Time or the additional packet information discussed with reference to FIG. 6. "MOD(x, y)" denotes the remainder of x divided by y. Further, the step involving the action "CLEAR Reg[i]" in the output management process 900 of FIG. 9 (e.g., see step 920) sets Index and Seq in the i+1-th register set to NULL and the other three member variables of the register set to zero as done in the initialization of the register sets.

Output management 900 as shown in FIG. 9 generally involves sending data in a WUSB isochronous packet format over a WUSB channel to a host (or host wire adapter or the like). Unlike wired USB, wireless USB isochronous transfer includes a handshake and a retry mechanism. The endpoint of a WUSB wireless device keeps the sent data in the loop buffer of the invention for possible retransmission until the acknowledgement indicating successful transmission is received. For IN transfer, the host inserts the acknowledgment (i.e., DINAck) for the last transaction into the work request (i.e., $W_{DT}CTA$) for the present transaction and sends it to the device. Once the endpoint receives the request directed to it from the host, the endpoint enters into the output state (see FIG. 7) and begins output management. In this function as shown in FIG. 9, the endpoint rotates its transmit window according to the host acknowledgement (i.e., DINAck) and updates the register sets to prepare one or more WUSB isochronous packets as requested by the new window.

As shown in the output management method 900 of FIG. 9, this work can be thought of as including the following five steps: (1) updating the sequence numbers in the register sets according to the new transmit window; (2) reusing the sequence numbers of the discarded packets; (3) updating the IndexS to the index of the first segment to be sent; (4) updating the additional isochronous packet information including Index, Len, Seg, and Time in the register sets with a null Index; and (5) sending the packets indicated by the register sets with non-NULL Index wirelessly to the host (or host wire adapter or the like). The method 900 begins with a host request ($W_{DT}CTA$) with an acknowledgment of the prior transaction being received by the endpoint at 902. At 904, the endpoint or its controller with a buffer manager or control module act to rotate the transmit window (e.g., in the data transmitter shown in FIG. 1) as indicated in the acknowledgment (DINAck).

Step 1 of the output management 900 is then performed at substeps 910 to 928 in FIG. 9. Step 1 involves the endpoint updating the sequence numbers in the register sets according to the new transmit window (i.e., after rotating in step 904). In endpoint memory, the register sets are arranged in the transmit order, and the sequence numbers should match this order. The positions of "1" bits in the received DINAck define the sequence numbers of packets in the transmit window. The index TxS and TxN are the start and end of the transmit window, respectively. By using the TxS index and the received DINAck, the endpoint updates the sequence number in each register set one by one. At 910, the index j pointing to the current register set to be updated and the index i pointing to the last scanning-stop position that is mentioned later are initialized. At 910, 922, 926, and 928, the endpoint searches the sequence number requested in DINAck from TxS to TxN. If the endpoint scans to TxN, which is determined at 926, it clears the register sets as shown at 924 and goes to Step 2, otherwise it prepares to update Seq of the current register set with the sequence number. The sequence number may indicate it is proper to request a retry or a new packet. The endpoint distinguishes the two cases at 912 and 918 and processes at 914 and 920, respectively. If a sequence number in the new transmit window (DINAck) also appears in the old transmit window and also has its position in the old window the same as or behind that in the new window, the endpoint can tell that the packet associated with the sequence number is requested for retry or retransmission by the host. Since Seq fields of the register sets keep the old transmit window, this determination is done at 912, 918, 916 by scanning the register sets behind the last scanning-stop position until the register set with the same sequence number is found or all of the register sets have been scanned. If the register set is found at 918, the packet pointed to by the register set needs to be retransmitted and all the content in the register set associated with the packet to be retransmitted are moved to the current register set as shown at 920. Otherwise, only the requested sequence number is written to the current register set and the other fields of the register set are cleared as shown at 914 In this manner, the endpoint does not have to recalculate register variables for these retransmitted packets. At 914, the endpoint increases j by one and prepares to update the next register set.

Step 2 of the output management 900 is then performed, which includes substeps 930 to 948, by the endpoint or its controller to reuse the sequence numbers of discarded packets. If Index in the first few register sets are determined to be all NULL and Index in the following register sets is non NULL, the packets associated with the sequence numbers contained in the first register sets have been discarded during input management (e.g., process 800 of FIG. 8), but they are now being requested to be retransmitted by the host. According to the WUSB Specification, Rev. 1.0, the endpoint should transfer the oldest available non-discarded packets using the same burst sequence number(s) as the discarded packet(s). In Step 2 of output management 900, this is achieved by the endpoint shifting all of the variables except the sequence numbers in the following register sets with non-NULL Index to the first register sets with NULL Index. At 930, Index of the first register set is checked to determine whether Step 2 is processed. At 934 to 944, the endpoint finds the first register set with non-NULL Index. If the register set cannot be found as determined at 944, the endpoint goes directly to Step 3. At 948, the content of the register sets behind the register set except Seq fields are moved to the register sets beginning at the first one with NULL Index.

The endpoint next performs Step 3 including substeps 950 to 968 of the method 900 to update IndexS to the index of the first segment in the first isochronous packet to be sent. If Index of the first register set is not NULL as checked at 950, IndexS is set to Index in the first register set at 960, otherwise it is set to IndexN at 958. In the case that maximum packet size is changed as determined in 964, the endpoint preferably packages the segments into the packets from IndexS. So, in this case, IndexN is set to IndexS and N is updated correspondingly as shown at 968.

Output management 900 continues with the endpoint or its controller performing Step 4 shown in FIG. 9 with substeps 970 to 988 by updating the variables or additional packet information Index, Len, Seg, and Time in the register sets with a NULL Index. When the maximum packet size or MPS is changed, all register sets are preferably updated as part of output management 900. Thus, the precondition of packaging a packet for a register set is that the register set has a NULL Index or MPS is changes as shown at 974. The packets associated with these register sets aggregate data segments from IndexN. To determine the presentation times for these new packets easily, the endpoint calculates the sample time of the segment at IndexN first with the equation Time=T−P(N−1) at 970. Then, sample times for subsequent data segments are determined by accumulating the interval P to Time as shown at 988. This technique avoids occupying much memory to record sample time for each segment. Because T keeps recording the sample of the last data segment in the buffer, the derived presentation times for the following packets will deviate little from the real ones and this provides a good trade off between complexity and accuracy.

At the beginning of packaging one packet, the endpoint may determine its presentation time and the index of the first segment. The endpoint aggregates data segments into the packet one by one and advances the presentation time and IndexN correspondingly at 988 until the end condition of Step 4 is satisfied or the packet cannot accommodate the next one because of the limits of maximum packet size or MPS, which is checked at 980. If the MPS is reached, the endpoint finishes packaging a packet and goes to the next one until the end condition of Step 4 is satisfied. This end condition is that all packets requested or segments in the buffer are done, which is checked at 972 and 973. If the segments after IndexN have two intervals (i.e., the original interval P and the new interval NextP), the first N segments own the original interval and the following NextN segments have the new interval. When the endpoint finishes packaging the segments with the original interval that is checked at 982, the endpoint changes N and P to NextN and NextP and calculates the presentation time as shown at 984. Substep 986 guarantees two segments with different intervals are not encapsulated into one packet by the endpoint. If host supports two different intervals in one packet, substep 986 can be cancelled without affecting any other functions.

At 990, the endpoint acts to perform Step 5 by sending the packaged packets indicated by the register sets with non NULL Index (i.e., packets in the current or new transmit window of the endpoint). At 998, the output management 900 ends. In FIG. 9, "Buffer[IndexN]" denotes the 16-bit integer stored in the IndexN+1-th and IndexN+2-th bytes of the buffer and "i:j" denotes from i to j. Also, "SUM(Reg[0:j−1].Seg)" denotes the sum of Segs in the register set 0 to the register set j−1.

Figure 10:
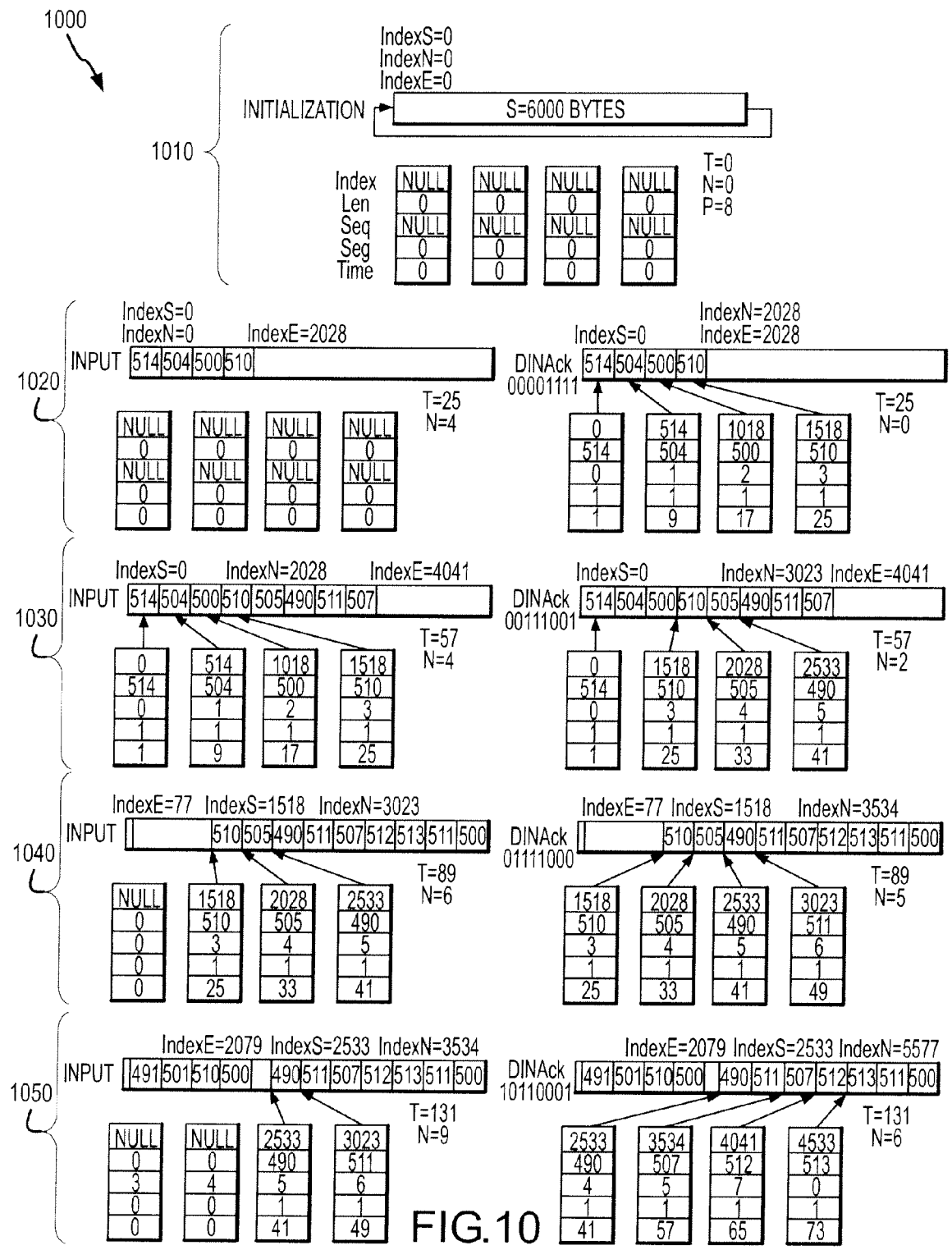
FIG. 10 illustrates an exemplary implementation of buffer management for an isochronous IN endpoint according to one embodiment of the invention.

FIG. 10 illustrates results at 1000 of a relatively simple experiment in which the buffer management methods described with reference to FIGS. 3-9 were implemented. In the experiment 1000, as shown at 1010, the size of the buffer is S=6000 bytes with MPS=600 bytes, MBS=4, and MaxSeq=8. Additionally in the experiment 1000, the interval between 2 consecutive data segments is 1 millisecond and the service interval over the air is 4 milliseconds. In each service interval, 4 data segments are written into the loop buffer. Input and output happen once and alternatively in one service interval. Note, in the general case, the input and output can happen more than once every service interval. The blocks in the buffer shown to include numbers at 1020, 1030, 1040, and 1050 denote the buffer space occupied by a valid data segment, whose length equals the contained number (in bytes for example). The open or unnumbered portions of the buffers denote free buffer space for the endpoint.

The experiment 1000 of FIG. 10 shows an implementation of the input and output management methods 800 and 900 shown in FIGS. 8 and 9. Specifically, the experiment 1000 through the steps or layers 1010-1050 deals with packaging a WUSB isochronous packet, discarding the oldest packets, and reusing their sequence numbers correctly and easily. Initialization 1010 is done when the endpoint is setup or reset. The variables: IndexS, IndexN, IndexE, T, N, NextT, NextN and NextP are set to zeros. Because a time unit of WUSB is ⅛ millisecond, P is set to 8 (1 millisecond). Index and Seq of the register sets are set to NULL and others are set to zeros. After initialization, the endpoint enters idle state. Steps 1020-1050 describe four times input and output management. The steps on the left of 1020-1050 are for input management and the steps on the right for output management. Write request transfers the endpoint from idle state to input state in the input management of 1020. Four data segments with the interval P'=8 are input into the loop buffer at time T'=25. Because P equals P', T is updated to T'(25) and N adds N'(4). IndexE is moved to the end of these data segments. After the input operations are finished, the endpoint goes back to idle state.

When WdtCTA and DINAck is accepted, the endpoint enters output state. In the output management of 1020, after rotating transmit window according to DINAck, TxS is 0 and TxN is 4. Since the host requests the four new packets, only Seq fields of the register sets are updated as 0, 1, 2, 3 in Step 1 of 900. Because no discarded packets are in the four packets, Step 2 does nothing. In Step 3, IndexS is updated to IndexN (0) since Index of Reg[0] is NULL. In Step 4, the endpoint initializes Time to 1 at 970 and aggregates data segments from IndexN(0). It advances IndexN by the length of the data segment and increases Time by P to track the presentation time by one once aggregating of a data segment is completed successfully. Because of the limit of MPS, one packet can accommodate only one data segment. At last, all of the data segments in the loop buffer are packaged into the requested four packets. Thus, IndexN is moved to IndexE, the number of unpacked data segments, N, is decreased to 0, and the fields of the four register sets are updated.

After these packets are sent in Step 5, the endpoint goes back to idle state until the next input at T=57 as shown in 1030. In the output management of 1030, DINAck shows the packets with sequence number 0, 3, 4, 5 are requested. TxS is 0 and TxN is 6 after transmit window rotation. In Step 1, the packets with sequence number 0 and 3 are found a retransmission. The content of Reg[0] and Reg[3] are copied to Reg[0] and Reg[1] respectively. Since the packets with sequence number 4 and 5 are new packets, Seq of Reg[2] and Reg[3] are set to 4 and 5 respectively and Index fields are set to NULL. In Step 3, IndexS is set to Reg[0].Index (0). In Step 4, the packets with sequence number 4 and 5 are aggregated because of the NULL Index of Reg[2] and Reg[3]. Two data segments are left unpacked in the loop buffer. In the input management of 1040, buffer overflow occurs. The packet associated with Reg[0] is discarded and Reg[0] is clear except Seq. IndexS is advanced to Reg[1].Index to release the buffer space before Reg[1].Index. In the output management of 1040, the packets with sequence number 3, 4, 5 are requested to retry and a new packet with sequence number 6 is also requested to send.

In Step 1, the content of Reg[1], Reg[2], Reg[3] are moved to Reg[0], Reg[1] and Reg[2] respectively and Reg[3].Seq is set to 6. Since no discarded packets are in the requested packets, Step 2 changes nothing. In Step 4, the new packet is aggregated. In the input management of 1050, buffer is overflowed again. The packets associated with Reg[0] and Reg[1] are discarded. In the output management of 1050, the packets with sequence number 4, 5, 7, 0 are requested. After transmit window rotation, TxS is 4 and TxN is 1. Step 1 determines the packets with sequence numbers 4 and 5 are two retransmitted packet and others are new packets. The content of Reg[1] and Reg[2] are moved to Reg[0] and Reg[1] respectively though the fields in Reg[1] except Seq are cleared in the input management. Reg[2].Seq and Reg[3].Seq are set to 7 and 0 respectively. In Step 2, since the NULL Index of Reg[0] denotes the packet with sequence number 4 is discarded, the content except Seq of Reg[1], Reg[2] and Reg[3] are moved to Reg[0], Reg[1], Reg[2] in order to reuse the sequence number 4. Thus, the original packet with sequence number 5 changes its associated register set from Reg[1] to Reg[0] and changes its sequence number to 4. Furthermore, in Step 4, since Reg[1].Index becomes NULL, the packet with sequence number 5 is recognized as a new packet and aggregated from IndexN.

Figure 11:
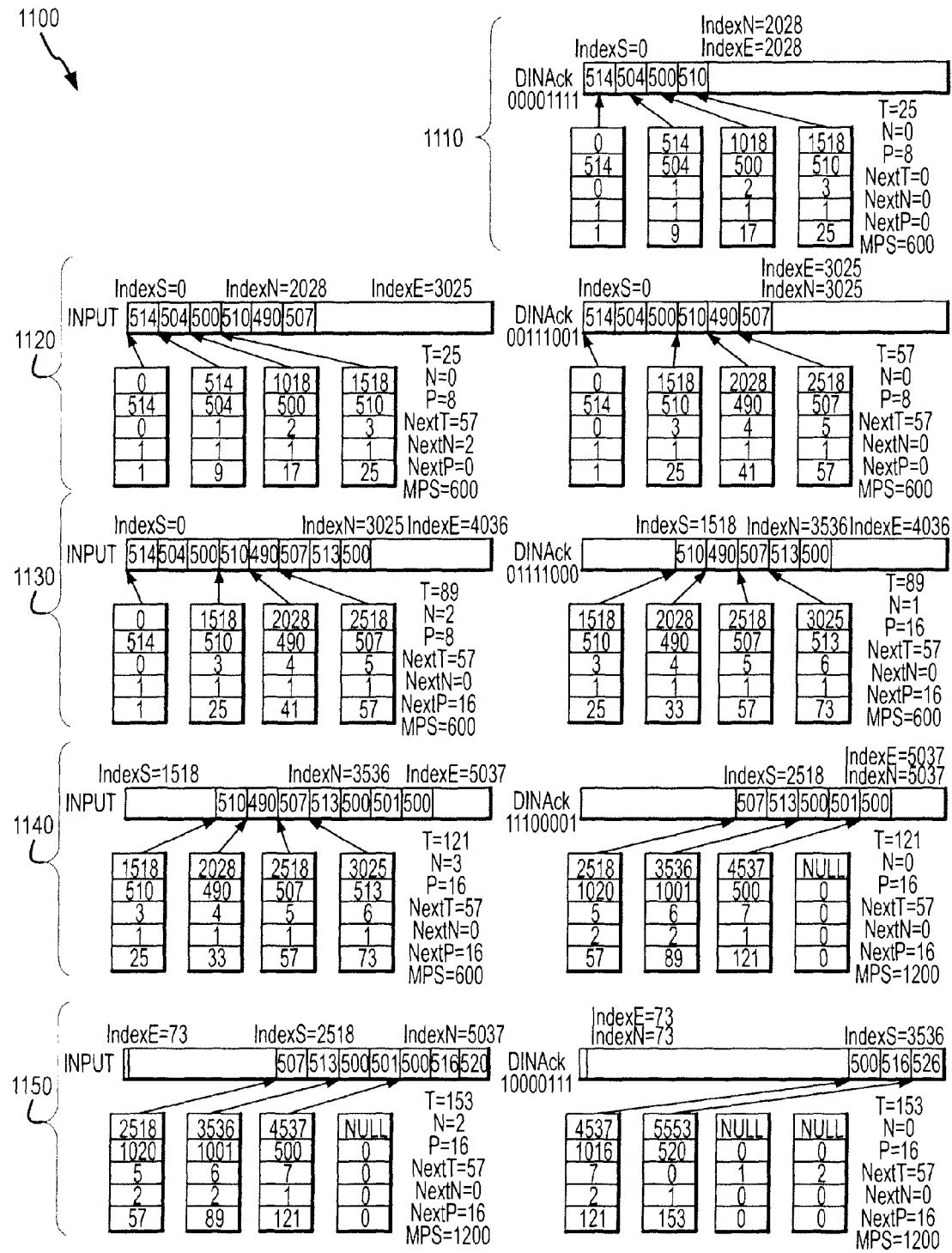
FIG. 11 illustrates an example of buffer management of the invention similar to the example of FIG. 10 but showing a case where the maximum packet size and interval are changed.

Further, in the same initial condition, FIG. 11 presents a more complex experiment 1100 with steps or layers 1110 to 1150. The experiment 1100 starts from 1110 that is the end state of 1020 in the experiment 1000. In the experiment 1100, the interval and maximum packet size are changed dynamically. The host uses an out of band mechanism, for example, to notify the application associated with the endpoint to change the segment interval to 2 milliseconds in this example. Then the endpoint generates and writes the segments with new interval P'=16 at 1120. Because P(8) is not equal to P', NextP, NextT and NextN record the current P', T' and N'. Since the new interval becomes two times of the original interval, N' decreases by half. In the output management of 1120, the endpoint uses the new interval NextP and concerned NextT, NextN to derive the presentation time after the data segments with the original interval are used up.

After the host receives the last segment with the original interval, it requests the endpoint to change the maximum packet size to 1200 bytes (for example but not as a limitation). The endpoint changes MPS at the output management of 1140. The retransmitted packets with sequence number 5 and 6 are repackaged with new MPS. Their presentation times are recalculated as well. Note, since there are not enough data segments in the buffer, the packet with sequence number 7 is shortened and the packet with sequence number 0 is left unpacked. The endpoint only sends the three packets associated with Reg[0], Reg[1] and Reg[2] in Step 5 because Reg [3].Index is NULL. The packets with sequence number 7 and 0 is retried in the next transaction 1150, the endpoint continues to aggregate the packet with sequence number 7 until it cannot accommodate the next segment anymore and then aggregates the packet with sequence number 0. In this experiment 1100, the buffer management methods shown in input and output management methods 800 and 900 and described elsewhere herein supports dynamic change of maximum packet size (MPS) and interval very well. Hence, the buffer management method is suitable to WUSB isochronous IN endpoints and devices incorporating such endpoints and even for those endpoints with dynamic switching and continuously scalable features.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. The buffer management method described above typically uses register sets equal in number to the maximum burst size or MBS to keep additional information for each WUSB isochronous packet in the transmit window and updates the registers with each transmission. This technique saves significantly on the amount of memory required to support isochronous IN endpoints relative to the examples provided in the WUSB Specification, Rev. 1.0 and shown in the enclosed FIG. 2. The buffer management of the invention presents detailed operations for associating the packets with the sequence numbers and how to discard data and reuse the sequence number when the endpoint buffer is in overflow (as verified or proven effective by experiments shown in FIGS. 10 and 11). One of the advantages of the buffer management method described in this document is that the new method supports dynamic changes of maximum packet size or MPS as well as the interval simply and smoothly (as verified with the experiment shown in FIG. 11).

We claim:

1. An apparatus for improved buffer management and for packaging Wireless Universal Serial Bus (WUSB) isochronous packets for transmission to a host, comprising:

a WUSB isochronous IN endpoint receiving data segments from a device function;

memory associated with the WUSB isochronous IN endpoint including a loop buffer and registers; and an endpoint controller managing the loop buffer with a set of buffer indices, storing the data segments sequentially in the loop buffer, assigning a set of the registers equal to the maximum burst size MBS defined for the WUSB isochronous IN endpoint to each of the WUSB isochronous packets in a transmit window, and deriving additional packet information to be stored in the assigned set of registers for each of the WUSB isochronous packets requested in the transmit window responsive to a received request from the host including a presentation time derived by the endpoint controller from a sample time of a last segment in the buffer and a time interval between two consecutive data segments in the buffer, a sequence number and an index into the loop buffer for the endpoint controller packaging the stored data segments into the WUSB isochronous packets to the host based on the data segments in the loop buffer having sequence numbers in the corresponding set of registers matching the transmit window sequence numbers, wherein the endpoint controller dynamically changes a maximum packet size (MPS) and/or a time interval between the data segments.

2. The apparatus of claim 1, wherein the stored data segments comprise sample blocks without sample time and a length of each of the sample blocks.

3. The apparatus of claim 1, wherein the additional packet information in the set of registers further comprises a sequence number, a packet length and a number of segments associated with a WUSB isochronous packet.

4. The apparatus of claim 1, wherein the WUSB isochronous IN endpoint receives a write request defining a number of segments to be input to the loop buffer, an interval between two segments, a sample time of a last segment, and a total length of the segments to be input and wherein the endpoint controller updates indices to the loop buffer to create room in the loop buffer prior to the storing of the data segments and discards oldest ones of the data segments when the loop buffer loop is in an overflow state.

5. The apparatus of claim 1, wherein the registers are arranged into a number of the sets of registers equal to the maximum burst size (MBS) defined for the WUSB isochronous IN endpoint.

6. The apparatus of claim 1, wherein the WUSB isochronous IN endpoint receives host instructions to transmit a set of data packets, and wherein the endpoint controller determines a transmit window including sequence numbers.

7. The apparatus of claim 1, wherein the endpoint controller receives a request to change the time interval between consecutive ones of the data segments to a different value and to change a maximum packet size (MPS) for use in packaging of the stored data segments in the loop buffer into packets and the endpoint controller responds by modifying or deriving the packet information in the register sets with new interval or MPS by using auxiliary variables to support the different value of the time interval and the changed MPS.

8. The apparatus of claim 1, wherein the WUSB isochronous IN endpoint, the memory, and the endpoint controller are provided in a device wire adapter (DWA) and the device function is provided in a USB device physically connected to a USB port on the DWA.

9. A method for managing buffers for isochronous IN endpoints in a Wireless Universal Serial Bus (WUSB) device transmitting to a host, comprising:

in memory of the WUSB device, providing a buffer for each of the isochronous IN endpoints and a set of registers with a number of the register sets equaling a maximum burst size defined for the corresponding IN endpoint;

receiving a plurality of data segments at one of the IN endpoints;

storing the data segments in the buffer provided for the one IN endpoint;

responsive to receiving a request in a transmit window by a host, storing, in register sets, an index, a presentation time, a packet length, and a number of segments for each packet requested in a transmit window wherein the presentation time is derived from a sample time of a last one of the stored data segments segment in the buffer and a time interval between two consecutive ones of the stored data segments;

packaging at least one of the stored data segments from the buffer into WUSB isochronous packet format for transmittal to a host using the index, the presentation time, the packet length, and the number of segments in one of the register sets; and storing a sequence number for each WUSB isochronous packet in the transmit window in the register sets associated with the WUSB isochronous packet, the sequence number being determined from the transmit window and being used in the packing of the WUSB isochronous packet to match the data segments to a sequence number in a transmit window for the IN endpoint, wherein the endpoint controller dynamically changes a maximum packet size (MPS) and/or a time interval between the data segments.

10. The method of claim 9, wherein the register sets are arranged in the memory for each of the isochronous IN endpoints in a transmit order matching the sequence numbers of the transmit window.

11. The method of claim 9, further comprising storing, in the associated one of the register sets, an index for a start location in the buffer for the associated data segments, a packet length for a total length of the associated data segments, and a number of the associated data segments and wherein the packaging comprises using the stored index, the packet length, and the number of the associated data segments to link the register sets with the stored data segments.

12. A buffer management method comprising:

providing an isochronous IN endpoint in a Wireless Universal Serial Bus (WUSB) device;

in memory of the WUSB device, providing a buffer for the IN endpoint;

in the memory of the WUSB device, providing a number of sets of registers;

receiving a write request from a host for data segments at the IN endpoint;

storing the data segments in the buffer;

linking one of the register sets to some consecutive ones of the data segments; and for each packet requested by the host in a transmit window determining additional packet information required for preparing a packet having WUSB isochronous format in each of the linked register sets wherein the additional packet information comprises a derived presentation time for the stored data segment and a sequence number for, and total length and number of, the stored data segment, wherein the presentation time is derived from a sample time of a last segment in the buffer and a time interval between two consecutive data segments in the buffer, the number of the register sets is equal to a maximum burst size defined for the isochronous IN endpoint, and the linking and the determining of the additional packet information are performed based on buffer indices, the register sets, and auxiliary variables to support dynamic change of a maximum packet size (MPS) or a time interval between the data segments.

13. The method of claim 12, further comprising after the storing of the data segments, discarding oldest ones of the data segments when the buffer is in an overflow state.

14. The method of claim 13, wherein the discarding is performed using the register sets and a set of buffer indices.

15. The method of claim 12, further comprising receiving a send request designating the transmit window at the isochronous IN endpoint and assigning sequence numbers requested in the transmit window to corresponding ones of the register sets according to the transmit order defined by the transmit window.

16. The method of claim 15, wherein the assigning of the sequence numbers comprises distinguishing retransmission sequence numbers in the transmit window and reusing the sequence numbers of discarded packets.

17. The method of claim 16, wherein the distinguishing and the reusing are performed with the register sets.

18. The method of claim 12, wherein the linking comprises storing an index to a start location in the buffer of associated ones of the consecutive data segments in the register sets.

* * * * *

UNITED STATES PATENT AND TRADEMARK OFFICE
CERTIFICATE OF CORRECTION

PATENT NO. : 7,865,636 B2  
APPLICATION NO. : 12/021187  
DATED : January 4, 2011  
INVENTOR(S) : Sen Jiang and Zhenning Peng Page 1 of 1

It is certified that error appears in the above-identified patent and that said Letters Patent is hereby corrected as shown below:

Column 18, line 29, delete "a sequence number,"

Column 19, line 13, delete "segment"

Signed and Sealed this
Twenty-eighth Day of June, 2011

David J. Kappos
*Director of the United States Patent and Trademark Office*